Figures 1, 2:
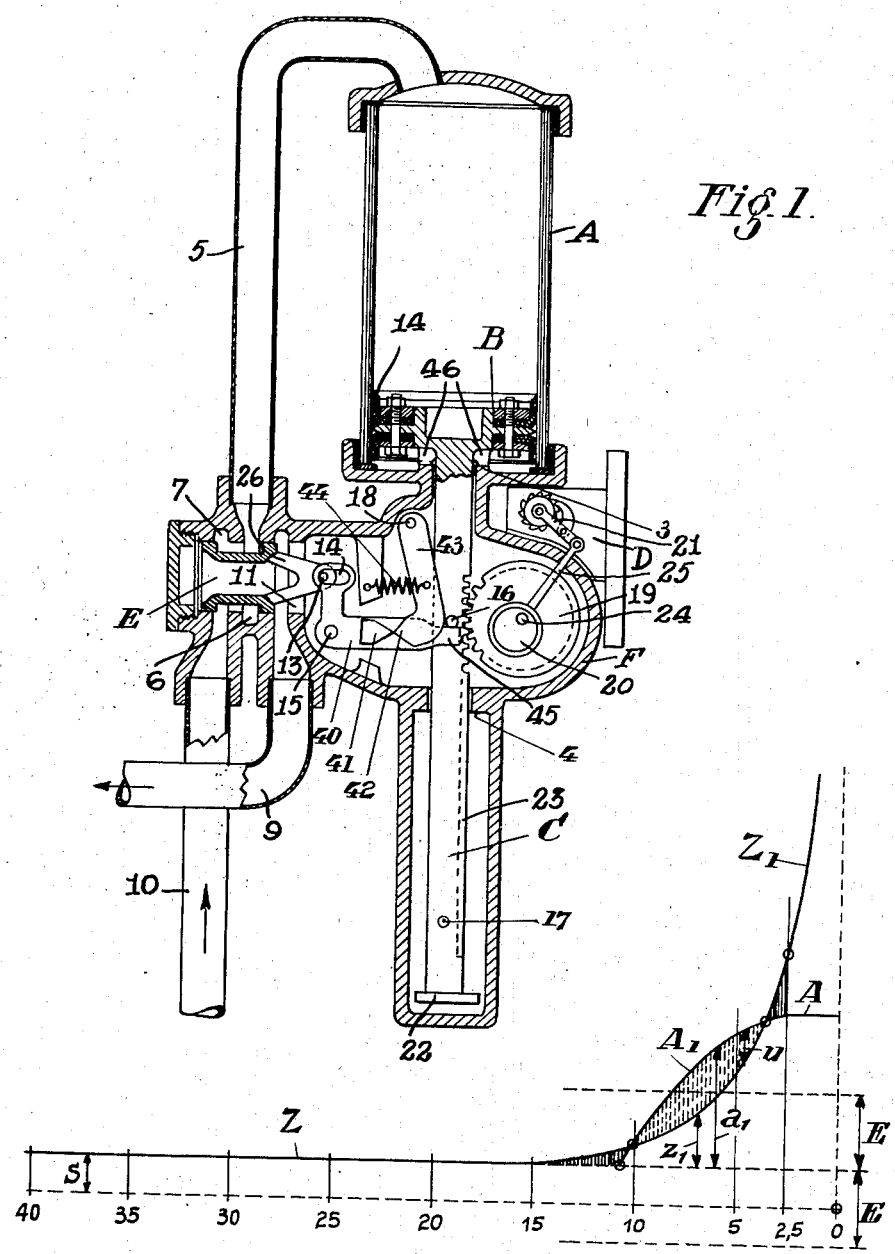

Feb. 12, 1935.  E. HURLBRINK  1,991,153

LIQUID MEASURING AND TAPPING DEVICE

Filed Aug. 19, 1933

Inventor:
E. Hurlbrink
By: Marks & Clerk
Attys.

Patented Feb. 12, 1935

1,991,153

UNITED STATES PATENT OFFICE 1,991,153

LIQUID MEASURING AND TAPPING DEVICE

Ernst Hurlbrink, Berlin-Westend, Germany, assignor to firm Martini-Hüneke und Salzkotten Maschinen- und Apparatebau-Aktien-Gesellschaft, Berlin, Germany Application August 19, 1933, Serial No. 685,929
In Germany August 31, 1932

8 Claims. (Cl. 221—100)

In the construction of apparatus for delivering and measuring liquids having a piston which moves to and fro in a cylinder forming the measuring spaces under the action of the liquid flowing into the cylinder under pressure, it has hitherto been assumed that it is a matter of importance to ensure that in all circumstances the piston shall perform a full stroke, in order in this way to obtain great accuracy in measuring. To this end it has been proposed to construct such apparatus in such a manner that the movement of the change-over member which alternately connects the supply pipe and the delivery or tapping off pipe to the respective ends of the cylinder is only completed after the piston has come up against its stroke limiting means, the change-over member being released by means of a pressure-operated member, the requisite pressure being only produced when the piston has actually reached the limit of its stroke.

In studying the behaviour of such apparatus a change-over member comprising a cylindrical, easy-running, completely balanced sliding control valve is generally employed, it has been found that this sliding control valve, if it is really to run easily, must work in its guiding means with a certain amount of clearance, in which case, however, a certain, even if a small amount of leakage must be tolerated. It is known that automatically operating measuring devices, for instance with a swashplate, without exception have a certain amount of leakage, the result of which is that an approximately accurate measurement is obtained only at a certain speed of operation, while, if operated particularly slowly, the quantity leaking through, which in unit time remains fairly constant, becomes relatively so serious that it represents an additional delivery far exceeding the admissible error or deviation.

If a measuring device operating with a piston is to be efficient, its measuring accuracy must within wide limits be independent of its operative speed. Now, it is possible for the sliding change-over member to be so constructed as to operate with less leakage than a swashplate, and the reciprocating piston may be so efficiently packed with packing collars bearing softly against the cylinder wall that, without offering any appreciable frictional resistance, it will prevent any measurable leakage. Nevertheless the leakage past the sliding member is not so small that it will not result in an excessive delivery when the operative speed is greatly reduced, for, if the sliding member is really to move with ease, (as is necessary in order to avoid considerable power having to be expended in effecting the change-over, which could only be obtained with an increased liquid pressure and a consequent increase in the leakage) it is necessary to give the sliding member in diameter a clearance of from 0.01 to 0.02 mm. Although at low liquid pressures the consequent leakage is sufficiently small not to cause too great a measuring error with certain variations in the operative speed, if the operative speed be greatly reduced, as compared with the small quantity measured in an extended period, the amount leaking past in this period will be so serious that the admissible error limit for the excess delivery will be exceeded.

According to my present invention in a measuring device of the character described, the increased amount of leakage occurring during slow operation is counteracted by actuating the reversing or change-over member of the apparatus in such a way that the movement of the change-over member is completed while the measuring piston is at a point spaced from the end of its stroke, so that when the apparatus is operated quite slowly, the supply and delivery pipes are changed over to the opposite ends of the cylinder so that the piston does not make a complete stroke and the diminution of the piston stroke thus produced compensates for the relative increase in leakage.

The invention is illustrated in the accompanying drawing, in which,

Fig. 1 shows a vertical longitudinal section through an apparatus according to the invention, while Fig. 2 shows a diagram illustrating the operation of the apparatus.

Referring to Fig. 1, the measuring apparatus comprises a measuring cylinder A of glass or other transparent material, in which the piston B is movable to and fro, said piston having a piston rod C secured thereto which passes out through the bottom of the cylinder. The piston rod is provided on one side with rack teeth 23 which mesh with a gear wheel 19 fixed on a shaft 24 on which is also fixed an eccentric 20 which transmits the to and fro movements of the piston B through an eccentric rod 25 and a ratchet lever 21 to the driving shaft of the counter D.

The lower end of the measuring cylinder is in open communication with the casing F which encloses the piston rod C and the eccentric mechanism 19, 20, said casing with the exception of an opening 11 communicating with the casing of a reversing or change-over control member E being closed in a fluid-tight manner. The member E is in the form of a tubular slide valve having a through bore and, for the purpose of ensuring easy operation, is guided in its casing with considerable play. The casing of the valve E has three ports, 6, 7, 8, therein, the middle one of which, namely the port 6 communicates through a pipe 5 with the upper end of the measuring cylinder A. The liquid which is supplied through the liquid supply pipe 10 by means of a pump (not shown) passes to the port 7 which is in the form of an annular passage, while the delivery pipe or tapping-off conduit 9 leading to the delivery point is connected up to the port 8 which is also in the form of an annular passage.

The change-over valve member N is reciprocated by means of a bell crank lever 40 which is pivoted at 15 inside the casing F and is provided with a slot 14 into which is passed a pin 13 fixed on a bracket 36 rigidly connected to the valve E. The other arm of the bell crank lever 40 carries a cam 41 having a knife-edge which coacts with a cam 42 which is likewise constructed as a knife edge and is fast on the free end of a lever 43 pivoted at 18 in the interior of the casing F, said arm being subject to the action of a tension spring 44. The limb of the bell crank lever 40 which carries the cam 41 is provided with an extension 45 which lies in the path of two driving pins 16, 17 projecting laterally from the piston rod C. The lower end of the piston rod C carries a collar 22 which acts as a stop member when the measuring piston B has reached the upper end of its stroke, the collar 22 at this moment coming into contact with an inwardly extending flange of the casing F. The downward stroke of the piston is limited by lugs 46 on the lower side of the piston coming into contact with a projection 3 on the casing F.

The mode of operation of the apparatus is as follows:

When, as shown in Fig. 1, the piston B has reached the lower end of its stroke, the limb of the bell crank lever 40 which bears the cam 41, is moved downwardly through the intermediary of the driving pin 16 on the piston rod C to such an extent that the point of the knife-edge cam 41 springs past the point of the cam 42. Up till now, the other end of the lever 40, owing to the slot 14, has barely moved the pin 13 during the last portion of the stroke of the piston, so that the valve E takes up the position shown, in which it has moved out of its left-hand end position only slightly. It does not remain stationary here, however, because immediately after the point of the one cam passes that of the other, the cam 42 under the action of the spring 44 slides over the cam 41 and forces the lever 40 further down and thereby, through the end of the slot 14 coming into contact with the pin 13, moves the valve E rapidly into its right-hand end position. In this position, the valve E connects the supply pipe 10 up to the lower side of the piston B, the piston being now forced upwardly while the liquid situated above it is forced through the pipe 5 which is now in communication with the delivery pipe 9. In this case, the valve E is moved over immediately the piston B has reached the upper or lower end of its stroke. All the apparatus of the kind referred to as previously proposed, operate in this manner.

In contradistinction to the previously proposed apparatus of the kind referred to which operate in the manner described, namely so that the valve E is thrown over at the moment when the piston B reaches the end of its stroke, in accordance with the present invention the arrangement is such that the valve is thrown over before the piston reaches the end of its stroke. This is preferably accomplished by suitably increasing the distance of the driving pins 16, 17 from the stroke-limiting stops 46, 22, so that the point of the knife-edge cam 41 springs past that of the cam 42, whereby the throw-over movement of the valve E is initiated sufficiently in advance to ensure the reversal of the valve being completed when the stops 46, 22 are at a certain distance from the stops 3 and 4, respectively, for instance from one half to one fifth of one percent of the length of the piston stroke. During operation at the normal operating speed the piston, owing to its inertia and the inertia of the column of liquid which is moving it, continues to move after the throw-over of the valve has been completed until it reaches the limits of its stroke, so that the entire contents of the measuring cylinder are forced through the pipe 9 and at the same time the interior of the cylinder on the other side of the piston is completely filled. When the apparatus is operated at a reduced speed, however, the reversal of the valve affects the motion of the piston while the latter is still at a certain distance from the end of its stroke as determined by the stroke limiting stops 46, 22 and their co-operating stops 3, 4, this distance being greater or less, according to the speed of operation of the apparatus, so that a correspondingly reduced quantity of liquid is delivered. This reduced delivery is supplemented by liquid which leaks through the valve E, owing to the loose fit of the latter in its casing, so that the quantity actually passed through the delivery pipe 9 is equal to that delivered during operation of the apparatus at its normal speeds.

By this means the leakage at a reduced speed is offset by shortening the stroke of the piston, so that within wide limits of variation of speed the permissible error will definitely not be exceeded.

In Fig. 2 the ratios of the increase in the quantity delivered due to the leakage and the decrease in the delivered quantity due to the shortening of the piston stroke in dependence on a diminishing speed of operation are shown. For the normal output of for instance 30 litres per minute an additional leakage quantity $s$ of for instance $\frac{1}{4}\%$ is already allowed for by a suitable reduction in the distance between the stops for limiting the piston stroke. This percentage quantity is also the same at 40 litres per minute and 20 litres, as the variation in the rate of delivery is more or less equalized by the change in the pressure difference on the sides of the valve E. It must be borne in mind that the amount of leakage passing through the slide valve clearance is also dependent on the effective pressure difference which is all the greater the more rapid the operation, as with more rapid operation the resistance to flow, which has to be overcome in the measuring device, increases to a corresponding extent. As soon, however, as the speed drops to less than about half the normal value there will be no further reduction in the pressure difference following further slowing down and the pressure is thus only dependent on the resistance due to the piston friction and the operation of the slide valve reversing means and the counting mechanism. These are fairly constant values, so that with a further drop in the speed the amount of leakage will be relatively greater, the greater the time occupied for the delivery of the same quantity of liquid. This results in the curve Z showing the increase in the quantity $s$ through leakage having a hyperbolic portion $Z_1$, one asymptote of which is a horizontal line below the horizontal line Z and spaced therefrom by a distance representing the normal amount of leakage $s$ (of for instance ¼%), while the other asymptote is the vertical line corresponding to zero delivery. It will be seen from this figure that with a great drop in the speed the additional percentage leakage $Z_1$ not compensated by the initial limitation of the piston stroke will become greater and greater, so that it will finally considerably exceed the permissible error E.

If in accordance with the invention the reversal of the slide valve takes place before the piston has reached its stroke limiting stop, for instance to such an extent that approximately 1% less liquid per stroke is displaced, there will with very small deliveries of for instance 0–2.5 litres per minute be a diminution in the quantity delivered by 1% of the stroke volume corresponding to the curve A. Assuming for the rest that the diminution of the piston stroke commences at a delivery of about 10–15 litres, it may be assumed to follow the course of the curve $A_1$ the ordinates of which are marked $a_1$. The additional leakage amounts $z_1$ are thus offset by the increased deliveries $a_1$, so that only the differences between the two amounts appear as errors "$u$", that is to say $u = z_1 - a_1$.

In the example under consideration the error $u$ for various deliveries $v$ in litres per minute is given in the following table

| when $v=$ | 20 l/Min. | 11 l/Min. | 10 l/Min. | 5 l/Min. | 3.5 l/Min. | 2.5 l/Min. |
|---|---|---|---|---|---|---|
| $u=$ | ±0% | +⅛% | +0% | −¼% | ±0% | +0.4% | and it will be seen that even when the speed is slowed down to 2.5 litres per minute it in no case reaches the permissible error of ±½%, while without a reduction in the piston stroke this limit would be already passed with a diminution of speed to less than 8 litres per minute.

It will thus be seen that by means of the shortening of the piston stroke at a reduced speed a very satisfactory correction is obtained at the critical reduction in speed to less than ⅓ of the normal speed, which makes it possible to remain within the limits of the permissible error even when the speed is smaller than for instance 1/10 of the normal speed.

It is not possible to specify whether to cause the reversal of the change-over member to take place when the piston is spaced at a quarter, half or three quarters of one per cent of its stroke from its end position, since it is necessary to ascertain by trial in the case of each model of the apparatus what stroke diminution adjustment is best. As a rule, however, at least ⅙% diminution of the stroke will have to be provided for at each reversal, that is to say a total stroke diminution of at least 2/6 = ⅓% should be aimed at, which is necessary owing to the increase in the amount of leakage which occurs, even with a very closely fitting slide valve, when operating particularly slowly.

I claim:—

1. Apparatus for delivering and measuring liquids, such as fuel, comprising: a measuring cylinder, a measuring piston movable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, actuating means for said change-over member and means associated with the piston and arranged to operate said actuating means at a point of each piston stroke such that the movement of the change-over member is completed while the piston is still spaced from its end position.

2. Apparatus for delivering and measuring liquids, such as fuel, comprising: a measuring cylinder, a measuring piston movable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, actuating means for said change-over member and means associated with the piston and arranged to operate said actuating means at a point of each piston stroke such that the movement of the change-over member is completed while the piston is still spaced from its end position by a distance amounting to at least one sixth of one per cent of the piston stroke.

3. Apparatus for delivering and measuring liquids, such as fuel, comprising: a measuring cylinder, a measuring piston movable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, resilient means adapted to be tensioned by said measuring piston and to control the movement of said change-over member, means associated with the piston and arranged to place the resilient means under tension and to release the resilient means at a point of each piston stroke such that the resilient means completes the movement of the change-over member while the piston is still spaced from its end position.

4. Apparatus for delivering and measuring liquids, such as fuel, comprising: a measuring cylinder, a measuring piston movable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, resilient means adapted to be tensioned by said measuring piston and to control the movement of said change-over member, means associated with the piston and arranged to place the resilient means under tension and to release the resilient means at a point of each piston stroke such that the resilient means completes the movement of the change-over member while the piston is still spaced from its end position by a distance amounting to at least one sixth of one percent of the piston stroke.

5. Apparatus for delivering and measuring liquids, such as fuel, comprising: a measuring cylinder, a measuring piston movable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, a lever to actuate said change-over member, a second lever adapted to operate said actuating lever and to be operated by it, the fulcrums of said levers being spaced apart from each other, resilient means adapted to cause said second lever to engage said actuating lever, a piston rod secured to said measuring piston, and means associated with said piston rod to operate said actuating lever at a point of each piston stroke such that the movement of the change-over member is completed while the piston is still spaced from its end position.

6. Apparatus for delivering and measuring liquids, such as fuel, comprising: a measuring cylinder, a measuring piston movable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, a lever to actuate said change-over member, a second lever adapted to operate said actuating lever and to be operated by it, the fulcrums of said levers being spaced apart from each other, resilient means adapted to cause said second lever to engage said actuating lever, a piston rod secured to said measuring piston, and means associated with said piston rod to operate said actuating lever at a point of each piston stroke such that the movement of the change-over member is completed while the piston is still spaced from its end position by a distance amounting to at least one sixth of one percent of the piston stroke.

7. Apparatus for delivering and measuring liquids, such as fuel, comprising: a measuring cylinder, a measuring piston movable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, an actuating lever, lost motion connecting means between said actuating lever and said change-over member, a spring actuated lever adapted to operate said actuating lever and to be operated by it, the fulcrums of said levers being spaced apart from each other, a roof-shaped cam secured to said actuating lever and adapted to engage said spring actuated lever, and means associated with said measuring piston to operate said actuating lever to move it past its dead centre position for operation by the spring actuated lever, said means being arranged to move the lever at a point in each piston stroke that the movement of the change-over member is completed while the piston is still spaced from its end position.

8. Apparatus for delivering and measuring liquids, such as fuel, comprising: a measuring cylinder, a measuring piston movable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, an actuating lever, lost motion connecting means between said actuating lever and said change-over member, a spring actuated lever adapted to operate said actuating lever and to be operated by it, the fulcrums of said levers being spaced apart from each other, a roof-shaped cam secured to said actuating lever, a roof-shaped cam on said spring actuated lever adapted to co-operate with the roof-shaped cam of said actuating lever so as to operate it and to be operated by it, a rod secured to said measuring piston, a pair of stops associated with said piston rod and having such a distance from each other, that the apexes of said cams will pass each other when the measuring piston is at a point of its stroke such that the movement of the change-over member is completed while the piston is still spaced from its end position.

ERNST HURLBRINK.